(12) United States Patent
Jarmany

(10) Patent No.: US 9,690,722 B2
(45) Date of Patent: Jun. 27, 2017

(54) MEMORY CONTROLLER AND MEMORY ACCESS METHOD

(71) Applicant: Quixant PLC, Cambridgeshire (GB)

(72) Inventor: Nicholas Jarmany, Cambridgeshire (GB)

(73) Assignee: QUIXANT PLC, Cambridgeshire (GB)

( * ) Notice: Subject to any disclaimer, the term of this patent is extended or adjusted under 35 U.S.C. 154(b) by 376 days.

(21) Appl. No.: 14/472,350

(22) Filed: Aug. 28, 2014

(65) Prior Publication Data
US 2015/0067216 A1    Mar. 5, 2015

(30) Foreign Application Priority Data

Aug. 29, 2013 (GB) .................................. 1315397.8

(51) Int. Cl.
| | |
|---|---|
| *G06F 13/16* | (2006.01) |
| *G06F 3/06* | (2006.01) |
| *G06F 13/24* | (2006.01) |
| *G06F 21/79* | (2013.01) |

(52) U.S. Cl.
CPC .......... *G06F 13/1668* (2013.01); *G06F 3/065* (2013.01); *G06F 3/0619* (2013.01); *G06F 3/0689* (2013.01); *G06F 13/24* (2013.01); *G06F 21/79* (2013.01)

(58) Field of Classification Search
CPC ..... G06F 13/1668; G06F 3/0619; G06F 3/065
See application file for complete search history.

(56) References Cited

U.S. PATENT DOCUMENTS

| | | | |
|---|---|---|---|
| 8,819,332 B2* | 8/2014 | Suto .................... | G06F 11/1068 711/103 |
| 2008/0096671 A1* | 4/2008 | Gagner ............... | G06F 11/1441 463/43 |
| 2013/0268739 A1* | 10/2013 | Gupta .................... | G06F 3/065 711/162 |

\* cited by examiner

*Primary Examiner* — Glenn A Auve
(74) *Attorney, Agent, or Firm* — Kwan & Olynick LLP

(57) ABSTRACT

A memory controller (10) for a plurality of banks of memory (55a-55c) is disclosed. The memory controller (10) includes an interface (20) connectable to a bus (60) to communicate with a processor (70). The memory controller (10) redundantly maps the plurality of banks of memory (55a-55c) to a memory space (50) and includes a plurality of memory operators, each of the plurality of memory operators being executable by the memory controller for performing a different function on data in the memory space (50) and/or one or more of the plurality of banks of memory (55a-55c). In response to receipt at the interface (20) of a request from the processor (70) for one of said memory operators, the memory controller (10) is configured to execute, independently of the processor (70), the respective memory operator on the memory space (50) and/or one or more of the plurality of banks of memory (55a-55c).

19 Claims, 3 Drawing Sheets

MEMORY CONTROLLER AND MEMORY ACCESS METHOD

CROSS-REFERENCE TO RELATED APPLICATIONS

This application incorporates by reference and claims the benefit of priority to GB 1315397.8 filed Aug. 29, 2013.

BACKGROUND OF THE INVENTION

The present invention relates to a memory controller, memory arrangement and memory access method and is particularly applicable for use in environments requiring high integrity of data stored in an auxiliary memory.

There are different architectures of memory controllers to suit different environments. In the case of the average home PC or even a business server, a single memory array is typically used for random access memory and loss of data due to a system crash, power failure or the like is considered unfortunate but not a disaster. Memory controller architectures have therefore evolved with the aim to protect the content of memory as best as is possible during standard operation without impacting on cost and usability of the computer.

However, in many environments, the integrity of data is key. For some, this is a regulatory requirement, for others it is essential that an accurate record of the state of a system, past transactions and the like has been captured.

For example, in slot machines and similar gaming machines, critical data needs to be maintained continuously, even after power cycle events, as it forms a record of what has happened on a machine and is a crucial method of countering fraud, amongst other uses In large jackpot situations, it is not uncommon for the entire machine to be taken away after a win and disassembled to ensure no tampering or data integrity issues exist.

As discussed above, this critical data needs to be maintained continuously, even after power cycle events. As it is necessary to be able to guarantee that data is written correctly, it is usual for this data to be stored in memory that has a fast access time. Any delays could mean data is not actually stored in the case of a power failure event. Random Access Memory (RAM) technology provides the necessary speed but conventional RAM does not maintain its stored data after a power cycle event. Therefore, non-volatile RAM (NVRAM) is often used in this environment. A requirement for use of NVRAM in machines is often contained within the technical specifications for slot machines laid down by the various regulatory bodies. The licensing of slot machines for use in particular jurisdictions normally requires demonstration and testing of compliance with these specifications.

As described above, maintaining the integrity of data that is stored in NVRAM under all circumstances is a crucial requirement. NVRAM performance is typically selected or designed to enable any critical data to be written before a power failure causes the system to stop functioning. In addition, mechanisms to protect against data corruption whilst not significantly impacting on NVRAM performance are desirable.

In order to attempt to achieve the resilience and performance desired, multiple (generally three) identical copies of the data are maintained, often spread across more than one physical memory device. The different areas of NVRAM where these copies of the data are stored are commonly referred to as "banks".

Traditionally, NVRAM has been implemented using low-power SRAM (Static Random Access Memory) due to its high speed and the ability to retain data when power is removed by the use of batteries or other backup power sources. However, NVRAM can be made up from memory devices that are inherently non-volatile without the need for backup power sources. Flash memory is generally not a good solution due to poor write performance and block-based architecture that requires whole areas to be erased before new data can be written, along with the limited write endurance of flash technology. More recently, non-volatile RAM technologies such as MRAM (Magneto-restrictive Random Access Memory) have started to be used as the technology becomes more mature and cost effective. MRAM has the speed and random access of SRAM along with essentially infinite endurance.

It will be appreciated that the requirement for NVRAM based data storage is a critical and specialised part of systems such as slot machines. However, NVRAM based data storage is used as an auxiliary memory for specific purposes and does not generally form part of a standard computer system. This generally means the NVRAM controller logic that interfaces the CPU of the slot machine to the NVRAM is specifically designed to match the needs of the slot machine industry.

The volume of data that needs to be saved and the frequency of updates usually results in a designer selecting NVRAM that has high performance. Indeed, poor NVRAM performance can impact the functionality of the game, as updates need to be made at critical phases of the game. If NVRAM operations do not complete in a timely manner, it can cause poor responsiveness in the game, as certain operations cannot continue until the NVRAM data is updated to maintain an accurate record.

In recent years, PC technology has tended to replace proprietary computer architectures in slot machines, due to the high performance, excellent graphics capabilities and relatively low cost. The NVRAM remained a specialist requirement and there was included via an interface to the CPU that has therefore evolved over the years to follow PC general system architecture.

NVRAM capabilities usually form part of the "logic box" of a slot machine, either integrated onto the CPU board or onto a card plugged into an expansion slot or bus of the CPU board. The interface between the NVRAM memory devices and the CPU is generally designed to be as high speed as possible. Ideally, the interface would be connected as directly as possible to the memory bus of the CPU to maximise performance. However, it is important to note that the NVRAM memory is a separate logical block inside the computer system to the "main memory" that the processor uses to execute programs and store general data etc. As the performance of main memory is so critical to the overall performance of a computer system, it is usual that the CPU connects to main memory over a dedicated bus, which generally precludes connection of other memory devices. Hence all other peripherals and special memory devices, such as NVRAM, usually connect to the computer logic via more general purpose interface buses.

Whatever the bus used to connect the NVRAM to the computer system, there is necessarily some logic required to interface the native signals of the memory chips that comprise the NVRAM to the bus of the CPU. This interface logic matches the differing physical signals and the timings between the raw memory chips and the interface bus. This logic enables the NVRAM to appear in the memory or I/O address space of the computer system. In the past, buses of the computer system were relatively simple and the required logic was also straightforward. The buses present on more modern computer systems, such as PCI, are more complex and require more sophisticated interfaces. This extra complexity means the necessary interface logic is often implemented using programmable logic devices such as FPGAs. The job of this logic is simply to allow the NVRAM memory to be accessed by the CPU and also to make sure the NVRAM is protected when system power is removed. The CPU is responsible for reading, writing and the manipulation of all NVRAM data, including any copies.

In recent years, a new form of bus has come to dominate the PC industry called "PCI Express". It is founded on the older PCI bus but provides for significantly faster data transfers using fewer physical signals. This is achieved by changing from a parallel-type bus (as in PCI) to a bus that is based on high speed serial bit streams. As the data is transmitted in serial form it has to be formatted into packets so that it can be correctly decoded at the receiving end, much like in a local area network (LAN). This requires even more sophisticated interface circuitry to interface the memory chips that comprise the NVRAM. This complexity precludes the use of simple logic for interfacing.

Although buses like PCI Express offer many benefits and potentially higher performance, they do have certain characteristics that are non-ideal for implementing NVRAM solutions. The most important of these drawbacks is latency. Although the data transfer bandwidth of a bus such as PCI Express (PCIe) is faster than older, parallel type buses they suffer one disadvantage. All transactions between a PCIe host and target require the request and any data to be assembled into a packet. In applications where large volumes of data are being sent in blocks (such as network traffic) this overhead is not significant. However, where small quantities of data need to be read from random locations the overhead can significantly impact overall performance. This can be in terms of bandwidth, but often more importantly in an application such as NVRAM for gaming, it can severely impact latency.

As the complexity and performance of gaming systems increases, the need for a high performance NVRAM function becomes more critical. With the random access nature of transactions with NVRAM, packet based buses such as PCI Express can introduce additional, latency related performance limitations. Typically the major impact to performance is with read cycles. With write cycles, modern computer architecture often "posts" write cycles, so they appear to complete quickly to the software. In fact the computer hardware is simply processing and "despatching" the write data in the background. This is not possible for read cycles, as the software requires the read data to be available before it can continue. Hence the hardware must complete the entire read operation and the software must wait.

In other applications of computers, read performance is often improved by the use of caching techniques—a copy of the data is kept in fast memory local to the CPU, and any request for data from the device is satisfied by the local cached copy that is available much more quickly. However, caching of NVRAM data in gaming is often not acceptable, as there is the possibility that differences could occur between the cached copy and the actual data stored in the NVRAM itself. So, for NVRAM in gaming read cycles are often the critical performance constraint.

Current NVRAM interface technology typically acts simply to make all NVRAM bank data available to the host processor. The NVRAM controller connects to the host CPU bus and takes care of translation of signals, protocols and timing etc. The NVRAM memory banks typically appear in the host processors memory (or I/O) address range, hence allowing the entire contents of NVRAM to be directly manipulated by the game software.

SUMMARY

According to an aspect of the present invention, there is provided a memory controller for a plurality of banks of memory, the memory controller including an interface connectable to a bus to communicate with a processor, the memory controller redundantly mapping the plurality of banks of memory to a memory space and includes a plurality of memory operators, each of the plurality of memory operators being executable by the memory controller for performing a different function on data in the memory space and/or one or more of the plurality of banks of memory, wherein, responsive to receipt at said interface of a request from said processor for one of said memory operators, the memory controller is configured to execute, independently of the processor, the respective memory operator on the memory space and/or one or more of the plurality of banks of memory.

Each of the memory operators when executed by the memory controller preferably perform a different function selected from a group including a hash or cyclic redundancy check on data stored at an address or address range, a comparison of data stored at an address or an address range, a data integrity check on data stored at an address or address range, a block copy or move operation for copying or moving data between different memory addresses or ranges. It will be appreciated that other operators such as encryption/decryption, file encoding or any other operation could be provided.

Each of the memory operators may be encoded in a field programmable gate array.

The memory controller may comprise a state machine, the state machine encoding each of the memory operators and being responsive to execute the respective memory operator upon receipt of a corresponding request at the interface.

The memory controller may further comprise:

a first control pathway to provide access to the memory space transparently of said banks of memory;

a second control pathway to provide access to each of said plurality of banks of memory;

a pathway selection input to receive a selection of the control pathway to be used for a memory access request received via the interface.

The first control pathway may provide access including a read request directed to a logical memory address or range, the controller being responsive to a read request to perform a read operation on corresponding address or address range of each memory bank redundantly mapped to the memory address or range.

The memory controller may be arranged to generate an interrupt should a mismatch in memory contents of memory banks be detected during said read operation.

The memory controller may be arranged to return a single copy of the read data in the event of no mismatch being detected.

The memory controller is preferably configured to perform said read operation independently of the processor of said host computer.

According to another aspect of the present invention, there is provided a memory arrangement including:

a first memory bank;

a second memory bank; and, a memory controller to mirror the first memory bank in the second memory bank to form a logical memory space, the memory controller being configured to perform, on demand and only using processing resources of the memory controller, a requestable one of a plurality of functions on data in the memory space and/or on one or more of the plurality of banks of memory.

The functions may be selected from a group including a hash or cyclic redundancy check on data stored in an address or address range, a comparison of data stored at an address or an address range, a data integrity check on data stored in an address or address range, a block copy or move operation for copying or moving data between different memory addresses or ranges. It will be appreciated that other functions such as encryption/decryption, file encoding or any other function could be provided.

Each function may be encoded in a field programmable gate array.

The memory arrangement may preferably include or comprise a state machine, the state machine encoding each of the functions and being responsive to execute the respective function upon receipt of a corresponding request by the memory controller.

The memory arrangement may further comprise:

a first control pathway to provide access to the logical memory space transparently of said banks of memory;

a second control pathway to provide access to each of said plurality of banks of memory;

a pathway selection input to receive a selection of the control pathway to be used for a memory access request.

The first control pathway may provide access including a read request directed to a logical memory address or range, the controller being responsive to a read request to perform a read operation on corresponding address or address range of each memory bank redundantly mapped to the memory address or range.

The memory controller may be arranged to generate an error condition should a mismatch in memory contents of memory banks be detected during said read operation.

The memory controller is preferably arranged to return a single copy of the read data in the event of no mismatch being detected.

According to another aspect of the present invention, there is provided a memory access method comprising:

redundantly mapping a plurality of banks of memory to a memory space;

providing an interface for receiving requests on the memory space;

in response to receipt of a request at the interface, performing one of a plurality of memory operations on the memory space and/or one or more of the plurality of banks of memory and reporting a result, the one of the plurality of memory operations being determined in dependence on the request.

The plurality of memory operations are selected from a set including:

a hash or cyclic redundancy check on data stored at an address or address range in the memory space or in the banks of memory;

a comparison of data stored at an address or an address range in the memory space or in the banks of memory;

a data integrity check on data stored at an address or address range in the memory space or in the banks of memory; and, a block copy or move operation for copying or moving data between different memory addresses or ranges in the memory space or in the banks of memory.

It will be appreciated that other functions such as encryption/decryption, file encoding or any other function could be provided.

The method may further comprise:

providing a first control pathway to provide access via the interface to the memory space transparently of said banks of memory;

providing a second control pathway to provide access via the interface to each of said plurality of banks of memory; and, receiving a pathway selection via said interface selecting the control pathway to be used for a memory access request.

Embodiments of the present invention seek to provide a memory controller and memory access method for memory types such as NVRAM. In preferred embodiments, the controller maps redundant memory banks into a memory space. In preferred embodiments, the memory controller has multiple selectable modes of operation: a first, direct memory access, mode in which memory banks are separately accessible in the memory space and a second, managed memory access, mode in which the controller offers coordinated access and functions to the memory banks. For a game using managed memory mode, the presence of memory banks is transparent and a single logical memory address space is presented, with the existence of the separate banks only being apparent should a mismatch be detected during a read operation. In managed memory access mode, operations to the memory address space are mirrored to each individual bank by the memory controller so as to enable cross-checks and maintain redundant copies of data.

In preferred embodiments, the memory control architecture seeks to provide increased overall performance in comparison to conventional controllers in environments such as slot machines. In preferred embodiments, techniques are employed in which the volume of data transferred across the bus, particularly reads, between the CPU and the memory are significantly reduced, providing significant benefits to the slot machine game.

In preferred embodiments, the controller is arranged to receive control inputs to cause creating and/or maintaining copies of data in the multiple memory banks. As such, the memory can be treated as a single memory by software with the redundant storage being handled transparently by the controller, thereby greatly reducing the game software's complexity for performing this function.

Preferably, the controller is operable to perform offloaded tasks for the CPU and software such as performing CRC calculations on data stored in NVRAM banks and other data integrity checks or data processing operations such as block copying of data.

Preferably, the controller has dual modes of operation, permitting direct access to the multiple banks of memory in a first mode of operation which therefore is compatible with existing gaming software and NVRAM management techniques and a second mode of operation in which enhanced functionality is enabled and data intensive computation tasks are offloaded from the CPU/software to the controller. Such modes enable functionality to gradually be made use of by customers as and when they are ready to make use of it.

In the second mode where enhanced functionality is enabled, each read operation request is preferably a request to read a logical memory address or range. A read request causes the controller to read of each address/range of each of the multiple memory banks Should a mismatch be identified between the contents of the various memory banks being read, this is preferably flagged to the requester such as via an interrupt. Assuming there is no mismatch, a single copy of the read data is passed back to the requester.

Preferably, operations of the enhanced functionality are performed by a suitably configured hardware component such as a programmed FPGA and no software is executed by the host CPU/operating system in performing the reads and data comparisons.

Preferably, the controller architecture is such that the application software such as that used for the slot machine remains in full control of all decision making processes regarding how data mismatches are handled when they are reported by the controller—the software remains in control of decision making and for any steps taken to resolve data mismatches that might arise. Preferably, data from all the memory banks is always accessible to the host CPU, the enhanced functionality offering managed reads, writes and other functions on demand to the host CPU.

Preferably, both normal and enhanced modes may be selectively accessed on demand. Should the host CPU decide at any time to leverage the enhanced functions (or revert to normal mode from enhanced mode), this is preferably accessible to it via the controller.

Corruption of data can preferably be identified by comparing the data held in the different banks Usually the data held in all the banks should be the same. A difference between data held in the banks indicates a corruption or error has occurred. Where more than two banks are maintained, it might be possible to not only identify but also correct bad data if two or more banks hold the same data. The analysis and action taken once a corruption is detected is usually handled by the game software.

In a preferred embodiment, the memory controller is implemented using combinatorial logic and one or more state machines. In such an implementation, there is no need for any "intelligence" inside the logic and no need for any processor. Indeed performing such functions using a local processor executing a program would almost certainly reduce overall performance. Instead, operations are simply defined in logical terms and in most instances would be implemented using one or more programmable logic (FPGA) hardware devices, ASICs or similar. Advantageously, the memory controller may offer memory operations to the CPU/host software environment. Examples of typical operations might be the copying of a block of data between NVRAM banks, comparing a range of memory between banks to check for differences, or calculation of a hash or CRC (Cyclic Redundancy Check) over a range of NVRAM data. Other operations may, for example, include such as data encryption or decryption based on an encryption key. This approach has the following benefits:—

1) As the logical operations are performed in hardware it is easy to make the operations work at the maximum speed of the NVRAM memory chips, with no "processing overhead" time. This ensures the maximum possible overall NVRAM performance.
2) If a microprocessor were embedded locally in the NVRAM logic it would need to execute a program. In the gaming industry there are strict requirements to provide mechanisms to verify any software in the system. A microprocessor would also have to operate at a much faster internal speed in order to achieve the same data throughput speed of simple hard logic. All this would add unnecessary complexity and cost.

In such an embodiment, the memory controller may offer local hardware automation of logically simple but data intensive processing functions. It is common for the gaming software to have to perform certain logical operations on ranges of data held in NVRAM. In conventional systems this would require the CPU to read the data from the NVRAM forming one bank, perform the required logical operation by software and write any result back to the NVRAM, and then repeat the process for each redundant bank. In embodiments of the present invention, the CPU communicates with the memory controller which then manages reads and writes to the individual memory banks, preferably in parallel.

Performing such operations locally in the NVRAM logic can significantly reduce the amount of data movement across the bus. For example, in a conventional system, generating a CRC of 10 KBytes of NVRAM data would require all this data to be moved across the bus to the CPU, the logical operation to be performed by the CPU in software and the result written back to the NVRAM across the bus. Performing these operations locally in the memory controller simply requires the CPU to send a few bytes to the NVRAM controller to specify the logical operation to be performed and the address range of the data to be processed. The control module 30 then performs the logical operation and simply notifies the CPU when the operation has been completed. This requires only a few bytes to be transferred across the bus rather than 10 KBytes. This is particularly important as the bulk of the saved memory transfers are reads, which suffer significantly from any latencies in the bus interfacing NVRAM to the host CPU.

BRIEF DESCRIPTION OF THE DRAWINGS

Embodiments of the present invention will now be described in detail, by way of example only, with reference to the accompanying drawings in which.

DETAILED DESCRIPTION

Figure 1:
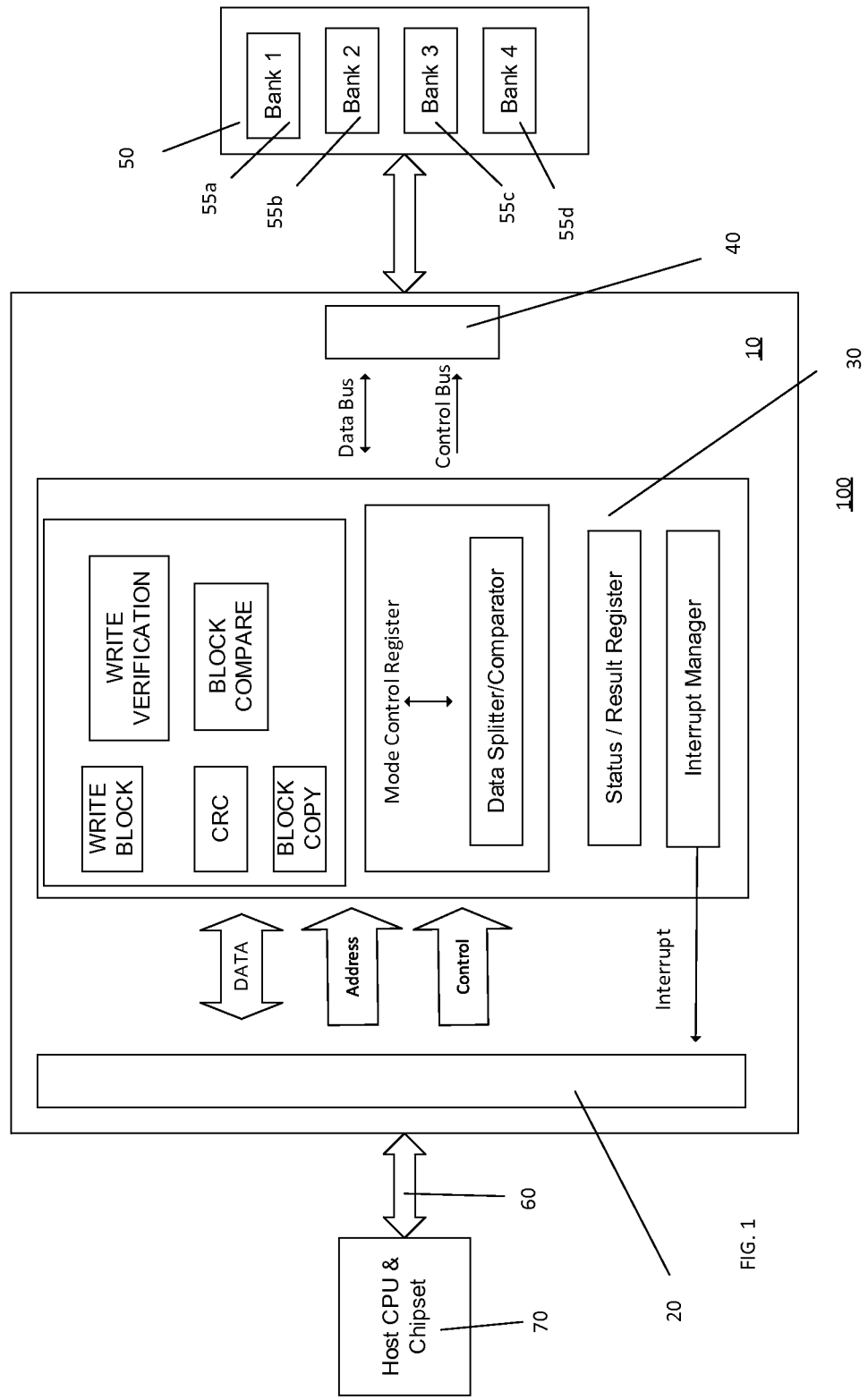
FIG. 1 is a schematic diagram of a memory controller according to an embodiment.

FIG. 1 is a schematic diagram of a memory controller according to an embodiment of the present invention.

The memory controller 10 includes an input interface 20, a processing module 30 and an output interface 40.

The output interface is arranged to communicate with each of a plurality of memory banks 55*a*-55*c* which collectively form a memory store 50.

The input interface 20 connects to a bus 60 of a computing device 100 and provides an addressable memory space corresponding to the memory store 50 to a CPU 70 (processor) of the computing device 100.

In one embodiment, the memory controller redundantly maps the plurality of banks of memory 55*a*-55*c* to the memory in the form of a memory space. In one embodiment, the memory controller includes a plurality of memory operators. Each of the plurality of memory operators is executable by the memory controller for performing a different function on data in the memory space and/or one or more of the plurality of banks of memory.

In response to receipt at the interface 20 of a request from said processor for one of said memory operators, the memory controller is configured to execute, independently of the processor 70, the respective memory operator on the memory space and/or one or more of the plurality of banks of memory.

In one embodiment, the memory controller has a direct memory access mode and a managed memory access mode. In the direct memory access mode, the memory controller 10 is substantially transparent and maps the addressable memory space to the individual banks 55a-55d of the memory store 50. This mode retains the flexibility for the host computer system to manipulate all the NVRAM data, including the data held in separate banks, under software control. This ensures that complete flexibility is retained. This is particularly advantageous should there be a need to resolve any discrepancies in the stored data as the data can be examined directly without influence by the memory controller 10.

In the managed memory access mode, the memory controller 10 manages the multiple banks 55a-55d and operations on them and presents them as a single addressable memory to the CPU 70. The processing module 30 receives data read and write requests from the CPU 70 via the bus 60 and input interface 20.

Preferably, the mode of operation is selected by the CPU/host system software via one or more registers associated with the controller 10.

In the case of a write request, a single copy of data to be written is communicated to the controller 10 and the processing module causes the data to be written to each of the different banks 55a-55d so as to produce a duplicated memory store in each bank.

In the case of a read request, the processing module 30 checks the respective data from each memory bank and performs a comparison of the obtained data. This is performed by a combination of logic and one or more state machines executed by the processing module 30. Data read from one of the banks is communicated to the CPU/requesting process. Should a mismatch of data be determined between banks during a read operation, the memory controller 10 is arranged to generate an interrupt to the CPU 70 and/or host system. Preferably, a register associated with the memory controller 10 or some other communications mechanism is used to convey data on the nature of the interrupt event to the game software along with other information (for example, the address at which a mismatch of data was found).

Instead of having to read data from each of the implemented banks across the interface bus as in conventional systems, in preferred embodiments of the present invention the memory controller operating under managed memory access mode, on receiving a read request automatically reads all banks simultaneously. It compares the data read from all the banks locally and generates a signal to the host CPU if a mismatch is detected and passes a single copy of the read data across the bus to the CPU otherwise. In a typical system that utilises three banks of data this mechanism reduces the volume of data transferred over the bus to the NVRAM logic by a factor of three, plus removes the overhead of the comparison operation(s), which is typically undertaken in software.

In one embodiment, the memory controller presents the memory operators as a number of commands that can be requested by the CPU 70. The commands are preferably encoded in the hardware or firmware of the controller (such as in one or more command state machines) that can be requested on demand by the CPU or an executing program of the computing device 100. Example commands may include CRC (cyclic redundancy check) operations, copying of a block of data between NVRAM banks, comparing a range of memory between banks to check for differences, block writes, write verification, block copy or calculation of a hash or other operation such as data encryption or decryption based on an encryption key.

Preferably, the command operators cause the memory controller to perform manipulation or processing of data held in the NVRAM memory banks 55a-55d.

Registers are preferably provided to allow commands to be sent to the memory controller 10 to cause it to execute the commands, and status registers are provided to indicate the results of the execution. The commands execute over blocks of data in the NVRAM devices and therefore take a finite time to complete. In preferred embodiments, a lock mechanism such as a free/busy register is implemented to prevent new operations from being started before previous ones have been completed. As a minimum this requires the memory controller to indicate when it is busy processing a certain task.

In one embodiment, management of the memory controller is performed using device driver software (and possibly associated software libraries) that is loaded by the operating system residing in the host computer. When the memory controller is in direct access mode, the device driver acts to allow the host computer software to directly access the raw data in the NVRAM memory banks. When the memory controller is in managed memory access mode, the device driver and associated libraries enable management of the higher level NVRAM functions and commands and to communicate back the various statuses of the NVRAM and/or the memory controller and manage any interrupts that are generated.

The extra complexity of the memory controller and the associated drivers and libraries means that changes may be needed to the way in which the game software interacts with the NVRAM memory in order to take advantage of the enhanced features and performance. However, due to the presence of the direct memory access mode, existing software can execute in an unmodified using this mode of the memory controller. Changes to the game software can be introduced at a convenient stage to switch on and take advantage of the enhanced modes of operation and commands, allowing a gradual migration. In addition, implementing the enhanced modes does not reduce flexibility in how the game manages data mismatches, as it is simple to switch back to direct memory access mode at any time to enable the game software to directly manipulate the raw data and decide how to manage and correct any discrepancies. Indeed it is generally intended that this is what would be the preferred action.

Figure 2:
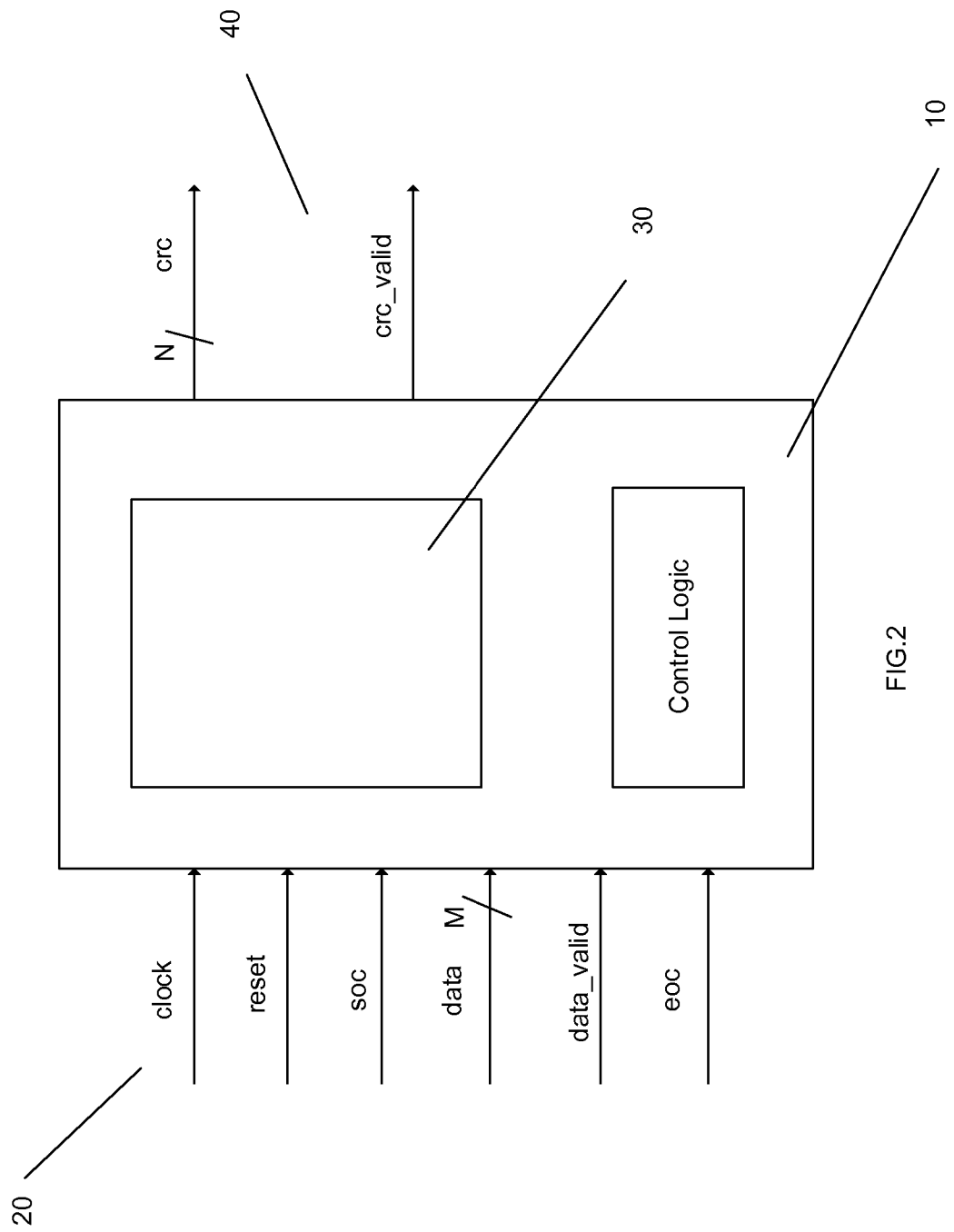
FIG. 2 is a schematic diagram of a memory controller according to an embodiment; and, FIG. 3 is an illustration of an example state machine executed by the memory controller of FIG. 2.

FIG. 2 is a schematic diagram of a memory controller according to an embodiment.

As in FIG. 1, the memory controller 10 includes an input interface 20, a processing module 30 and an output interface 40.

The output interface 40 is arranged to communicate with each of a plurality of memory banks 55a-55d which collectively form a memory store 50. Additionally, the output interface 40 includes output pins on which state data on operation of functions of the memory controller 10 is available.

Example signal inputs at the input interface 20 are illustrated. These are received via the bus of the computing device (not shown).

In operation, the memory controller 10 receives signal inputs from the computing device at the input interface. In the illustrated embodiment, the signal inputs concern a CRC (cyclic redundancy check) command to be executed on a block of data at an address range in the memory store 50. In managed memory access mode, the memory store 50 is presented as a single addressable memory space to the computing device and the presence of underlying memory banks 55a-55c is transparent to the computing device. A CRC calculation may be executed (preferably with execution taking place in parallel) against each individual bank. While only a single CRC result is presented to the requester in the case of a matching CRC being calculated for each bank, any mismatch in calculated CRCs for the respective banks would, in this mode of operation, result in an error being reported, such as via asserting a predetermined interrupt.

In direct memory access mode, the bank(s) to be used can be designed via the signal inputs.

Preferably, in order to protect integrity of data in the NVRAM, read and write access to the NVRAM is inhibited until the CRC command execution is completed by the FPGA.

Table 1 below sets out example signal inputs and outputs:

TABLE 1

| Signal Name | Bit # | Description |
| --- | --- | --- |
| Clock | 1 | clock to crc engine |
| Reset | 1 | reset to crc engine |
| Soc | 1 | start of crc. One clock pulse along with the first data to initialize the initial values. data_valid must be asserted with this indication |
| Data | 32 | data on which the crc has to be computed. This data is validated with data_valid. Those data for which data_valid = '1' will only be taken-in for crc computation, data for which data_valid = '0' will be ignored. |
| Data_valid | 1 | data_valid pin validates input data, only data for which data_valid pin = '1' will be taken-in to the crc engine. Data for which data_valid = '0' will be ignored. |
| Eoc | 1 | end of crc indication. One clock pulse, along with the last data. Indication of last data to the crc engine. data_valid must be asserted with this indication |
| Crc | 32 | Computed crc will be available on these pins. CRC is valid only when crc_valid = '1'. |
| Crc_Valid | 1 | When crc_valid = '1' indicates that the crc computation is done and crc checksum is available on crc pins. When crc_valid = '0', crc pins may contain intermediate crc value which may not be used. |

The CRC executed by the memory controller may, for example, be a CRC 32 type code as set out in IEEE standard 802.3. It will be appreciated that other CRC calculations may be performed and indeed, other check or calculation operations as discussed above could be implemented and performed in a similar manner.

The memory controller enables allows the computing device and software applications to use the FPGA hardware implemented data processing modules for background computation, thus reducing the access to NVRAM memory and the load of the computing device's CPU.

Figure 3:
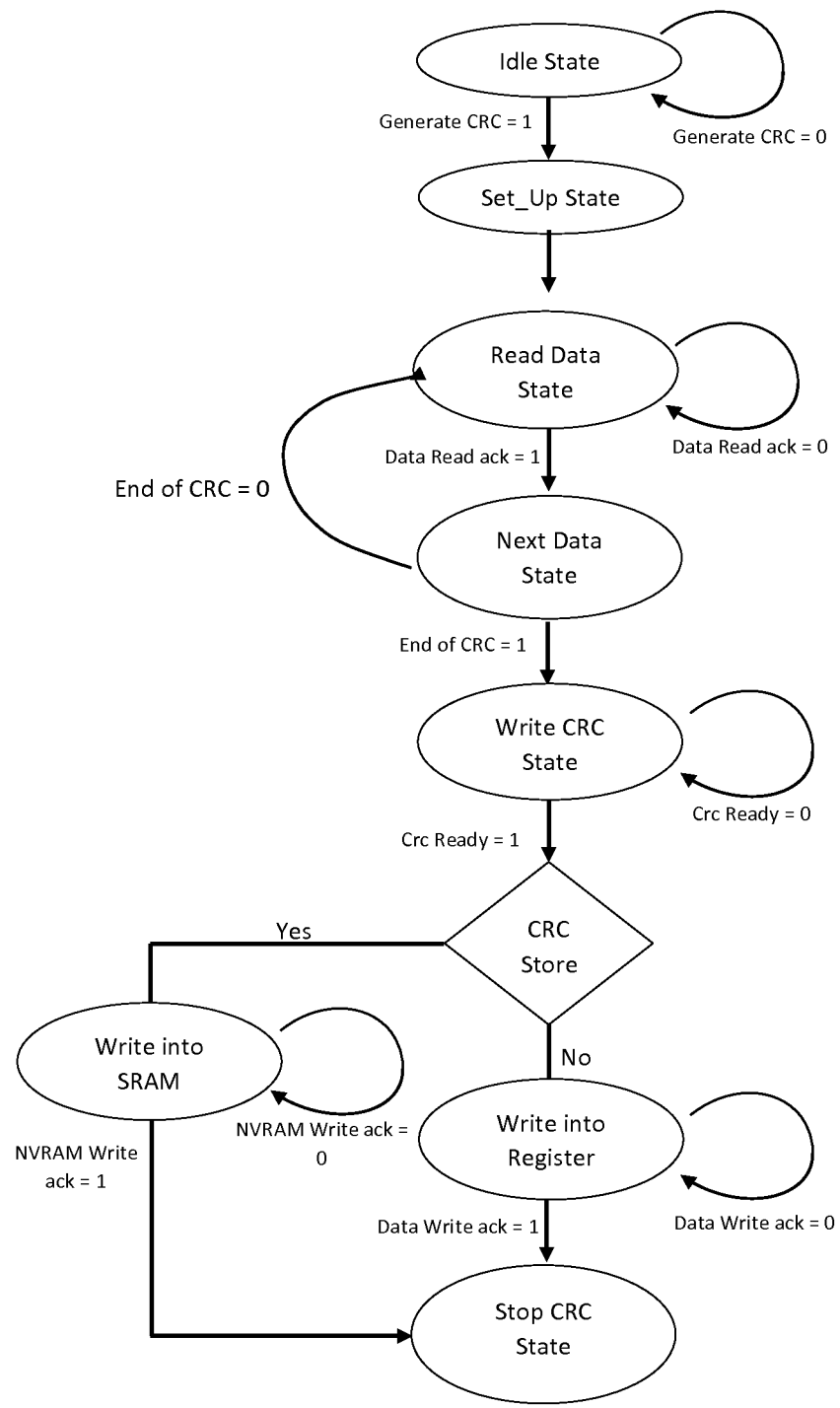

FIG. 3 is an illustration of an example state machine executed by the memory controller of FIG. 2 for the purpose of CRC calculation.

The invention claimed is:

1. A memory controller for a plurality of banks of memory,
    the memory controller including an interface connectable to a bus to communicate with a processor,
    the memory controller redundantly mapping the plurality of banks of memory to a memory space and includes a plurality of memory operators, each of the plurality of memory operators being executable by the memory controller for performing a different function on data in the memory space and/or one or more of the plurality of banks of memory, wherein, responsive to receipt at said interface of a request from said processor for one of said memory operators, the memory controller is configured to execute, independently of the processor, the respective memory operator on the memory space and/or one or more of the plurality of banks of memory;
    a first control pathway to provide the processor access to the memory space as a single addressable memory wherein, when first data is stored in the single addressable memory and a duplicate of the first data is stored in one of the plurality of banks of memory, the one of the plurality of banks of memory is not visible to the processor and the processor is not able to access the duplicate of the first data via the first control pathway;
    a second control pathway to provide the processor direct access to the data in each of said plurality of banks of memory including the first data and the duplicate of the first data;
    a pathway selection input to receive a selection of one of the first control pathway or the second control pathway to be used for a memory access request received via the interface from the processor.

2. The memory controller of claim 1, wherein each of the memory operators when executed by the memory controller perform a different function selected from a group including a hash or cyclic redundancy check on data stored at an address or address range, a comparison of data stored at an address or an address range, a data integrity check on data stored at an address or address range, a block copy or move operation for copying or moving data between different memory addresses or ranges.

3. The memory controller of claim 1, wherein each of the memory operators is encoded in a field programmable gate array.

4. The memory controller of claim 1, comprising a state machine, the state machine encoding each of the memory operators and being responsive to execute the respective memory operator upon receipt of a corresponding request at the interface.

5. The memory controller of claim 1, wherein the first control pathway provides access including a read request directed to a logical memory address or range, the memory controller being responsive to a read request to perform a read operation on corresponding address or address range of each memory bank redundantly mapped to the memory address or range.

6. The memory controller of claim 5, wherein the memory controller is arranged to generate an interrupt should a mismatch in memory contents of memory banks be detected during said read operation.

7. The memory controller of claim 6, wherein the memory controller is arranged to return a single copy of read data in the event of no mismatch being detected.

8. The memory controller of claim 5, wherein the memory controller is configured to perform said read operation independently of the processor.

9. The memory controller of claim 1, wherein the processor is configured to execute gaming software.

10. The memory controller of claim 1, wherein the memory controller is configured to offload computational tasks from the processor when the first control pathway is used.

11. A memory arrangement including:
    a first memory bank;

a second memory bank; and,
   a memory controller to mirror the first memory bank in the second memory bank to form a logical memory space, the memory controller being configured to perform, on demand and only using processing resources of the memory controller, a requestable one of a plurality of functions on data in the memory space and/or on one or more of the first memory bank or the second memory bank;
   a first control pathway to provide access to the logical memory space as a single addressable memory wherein, when first data is stored in the single addressable memory and a duplicate of the first data is stored in the second memory bank, the second memory bank is not visible and access to the duplicate of the first data in the second memory bank is not provided via the first control pathway;
   a second control pathway to provide direct access to the data in each of said first memory bank and said second memory bank including the first data and the duplicate of the first data;
   a pathway selection input to receive a selection of one of the first control pathway or the second control pathway to be used for a memory access request.

12. The memory arrangement of claim 11, wherein the functions are selected from a group including a hash or cyclic redundancy check on data stored in an address or address range, a comparison of data stored at an address or an address range, a data integrity check on data stored in an address or address range, a block copy or move operation for copying or moving data between different memory addresses or ranges.

13. The memory arrangement of claim 11, wherein each function is encoded in a field programmable gate array.

14. The memory arrangement of claim 11, comprising a state machine, the state machine encoding each of the functions and being responsive to execute the one of a plurality of functions upon receipt of a corresponding request by the memory controller.

15. The memory arrangement of claim 11, wherein the first control pathway provides access including a read request directed to a logical memory address or range, the controller being responsive to a read request to perform a read operation on corresponding address or address range of each memory bank redundantly mapped to the memory address or range.

16. The memory arrangement of claim 15, wherein the memory controller is arranged to generate an error condition should a mismatch in memory contents of memory banks be detected during said read operation.

17. The memory arrangement of claim 16, wherein the memory controller is arranged to return a single copy of read data in the event of no mismatch being detected.

18. A memory access method comprising:
   redundantly mapping a plurality of banks of memory to a memory space;
   providing an interface for receiving requests on the memory space;
   providing a first control pathway to provide access to the memory space as a single addressable memory wherein, when first data is stored in the single addressable memory and a duplicate of the first data is stored in one of the plurality of banks of memory, the one of the plurality of banks of memory is not visible and access to the duplicate of the first data in the one of the plurality of banks of memory is not provided via the first control pathway;
   providing a second control pathway to provide access via the interface to each of said plurality of banks of memory including the first data and the duplicate of the first data; and,
   receiving a pathway selection via said interface selecting one of the first control pathway or the second control pathway to be used for a memory access request;
   in response to receipt of a request at the interface, performing one of a plurality of memory operations on the memory space and/or one or more of the plurality of banks of memory and
   reporting a result, the one of the plurality of memory operations being determined in dependence on the request.

19. The memory access method of claim 18, wherein the plurality of memory operations are selected from a set including:
   a hash or cyclic redundancy check on data stored at an address or address range in the memory space or in the banks of memory;
   a comparison of data stored at an address or an address range in the memory space or in the banks of memory;
   a data integrity check on data stored at an address or address range in the memory space or in the banks of memory; and,
   a block copy or move operation for copying or moving data between different memory addresses or ranges in the memory space or in the banks of memory.

* * * * *